May 14, 1963 J. A. PAGET 3,089,838
SAFETY SYSTEM FOR CONTROL ROD
Filed July 31, 1961
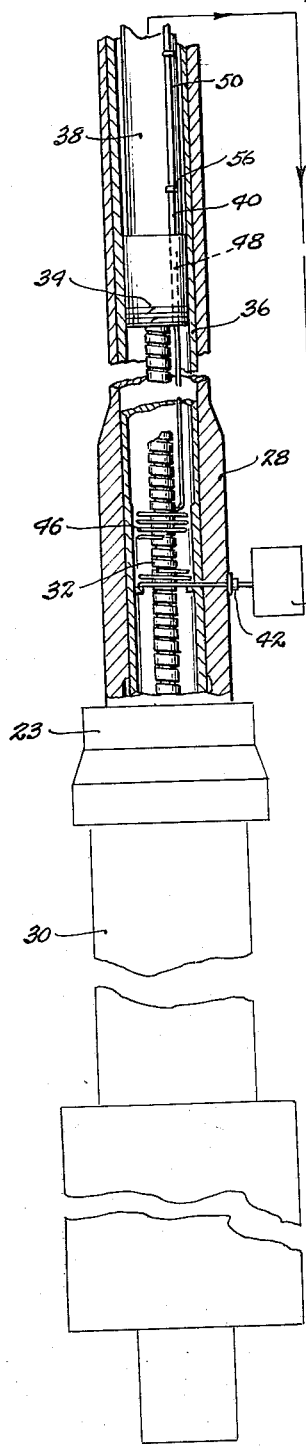
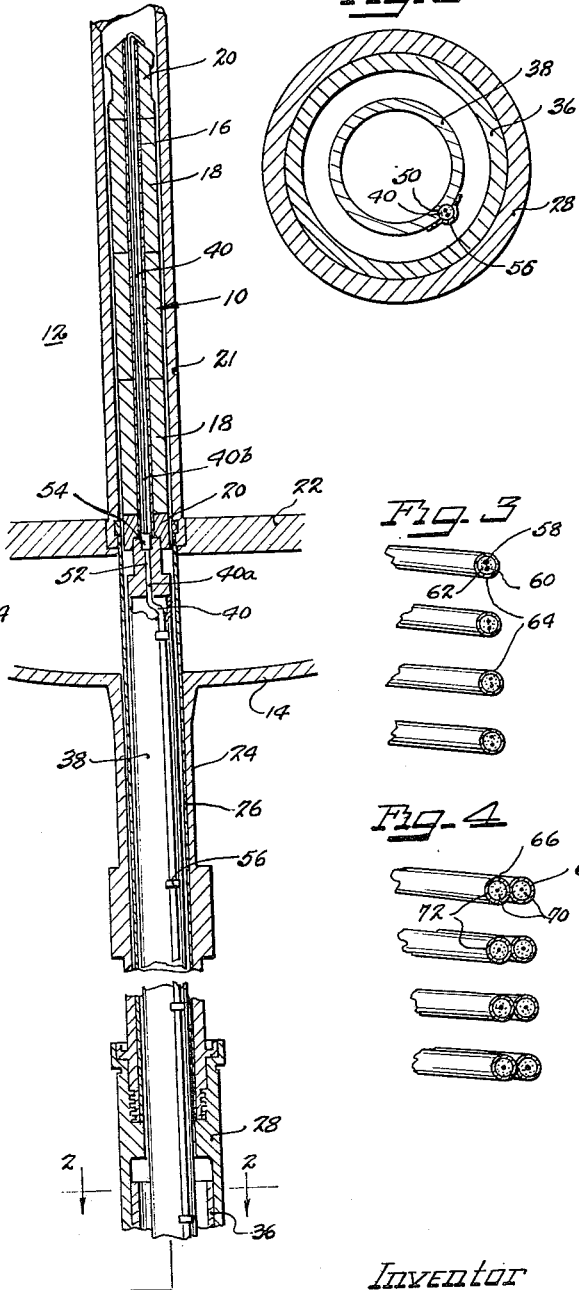
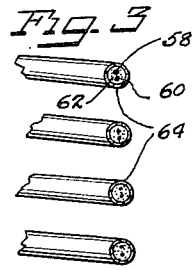
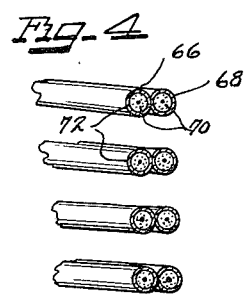
Inventor
JOHN ARTHUR PAGET
By Roland A. Anderson
Atty United States Patent Office 3,089,838
Patented May 14, 1963

3,089,838
SAFETY SYSTEM FOR CONTROL ROD
John Arthur Paget, Poway, Calif., assignor, by mesne assignments, to the United States of America as represented by the United States Atomic Energy Commission
Filed July 31, 1961, Ser. No. 128,274
2 Claims. (Cl. 204—193.2)

The present invention relates to a safety system for a control rod and more particularly to a system for monitoring the integrity or structural continuity of a control rod utilized in a nuclear reactor.

A nuclear reactor can be operated at a selected power level by controlling the neutron production within the reactor core. Generally, instrumentalities associated with the reactor are utilized to control the neutron production. For example, the neutron production may be controlled by the absorption of neutrons through the utilization of one or more control rods that are selectively positioned within guide tubes located in the reactor core. Such control rods are arranged so that they may be selectively inserted into the core or withdrawn therefrom when it is desired to temporarily increase or decrease reactivity and accordingly vary the power level of the reactor. In conventional nuclear reactors a control rod drive mechanism is provided to effect this movement of the control rods relative to the operating reactor core.

Normally, every precaution is taken in the design and construction of control rods used in nuclear reactors and in the drive mechanisms which control the movement thereof. However, situations have arisen and can arise whereby a control rod might break and a portion thereof might become lodged within the guide tube provided therefor in the operating reactor core. If a certain selected power level has been reached by the withdrawal of control rods, one of which is broken, and a portion of the broken rod remains lodged in the reactor core, a hazard exists in that the portion of broken control rod lodged in the guide tube might thereafter become dislodged and drop from the core region. Manifestly, a sudden increase in the power level of the reactor can result and, under certain circumstances, lead to a serious accident.

An object of the present invention is the provision of a control rod monitoring system which yields an indication of any break or severance in the structural continuity of a control rod situated within the core of a nuclear reactor. A further object of the invention resides in the provision of a control rod integrity monitoring system which is responsive to a break in a control rod situated within a nuclear reactor and which can function to either "scram" the reactor or otherwise prevent any unusual power level variation that might result from the berak. Another object resides in the provision of a system that is responsive to any break in the control rod or disassociation of the control rod with the control rod drive mechanism to actuate other instrumentalities and restrict the power level of the reactor to a safe value.

Other objects and advantages of the present invention will become apparent from the following detailed description when considered in conjunction with the accompanying drawings.

In the drawings:

FIGURE 1 is a vertical cross-sectional view of a control rod and a portion of a control rod drive mechanism adapted with a preferred embodiment of a control rod monitoring system contemplated by the present invention;

FIGURE 2 is an enlarged horizontal cross sectional view taken along the line 2—2 in FIGURE 1;

FIGURE 3 is a fragmentary view of one embodiment of a portion of the electrical cable employed in the control rod continuity monitoring system shown in FIGURE 1; and FIGURE 4 is a fragmentary view of another embodiment of the electrical cable shown in FIGURE 1.

A control rod integrity monitoring system in accordance with the present invention generally includes, an electrical conductor which extends along a control rod employed in a nuclear reactor and is secured to the control rod at least at two locations therealong. Electrical instrumentalities, which are responsive to an open circuit, are connected to the conductor. Any separation in the control rod between the two secured locations severs the conductor, and the electrical instrumentalities yield an indication of the separation. The electrical instrumentalities can be used to prevent any unusual power level variation that may result from such a separation of the control rod.

More specifically, the control rod integrity monitoring system illustrated in FIGURE 1, is employed to monitor the integrity of a vertically extending, control rod 10 which is inserted into and withdrawn from a gas cooled reactor core 12 from a position below a pressure vessel 14 which encloses the core 12. The control rod 10, which is diagrammatically shown in FIGURE 1, generally includes a vertically extending central tube or support 16, and a plurality of tubular segments 18 of neutron absorbing material which are stacked in end to end relationship on the tube. The tubular segments are maintained in position on the tube by suitable end members 20. The control rod 10 is guided in its movement in the reactor core 12 by a vertically extending hollow guide tube 21, the lower end of which is supported by a lower grid plate 22 of the reactor core 12.

The control rod 10 is inserted into and withdrawn from the reactor core 12 by a control rod drive mechanism 23 which is disposed below the control rod 10 and is suitably connected to a nozzle 24 extending downwardly from the pressure vessel 14. A hollow lead shield 26 is secured within the nozzle in concentric relation thereto.

The drive mechanism 23 which is shown diagrammatically in FIGURE 1, includes a vertically extending, generally tubular housing 28 connected to the lower end of the nozzle 24 and a drive means 30 which may be of the conventional type. The drive 30 rotates a vertically extending lead screw 32 and thereby causes movement of a cylindrical nut 34 threadably engaged therewith. The nut 34 is slidably disposed within a vertically extending guide tube 36 provided within the housing.

The nut 34 is connected to the lower end of a vertically extending hollow push rod 38 which telescopes over the lead screw 32. The upper end of the push rod 38 is connected to the lower end of the control rod 10 by a latch (not shown) or other suitable connecting means for affording assembly of control rod 10 with the push rod 38.

In the accompanying drawings, the diagrammatically represented control rod 10 is shown as being in a fully inserted position within the guide tube 21. In a fully withdrawn or "down" position, the control rod 10 is normally situated within the portion of the pressure vessel nozzle 24, which is provided with the cylindrical lead shield 26.

The illustrated control rod integrity monitoring system includes a cable 40 formed of a pair of insulated conductors. The lower end of the cable 40 is connected to a feed through electrical connector 42 which is suitably secured to the housing 28. The connector 42 serves to join the cable 40 to an external control circuit 44 (described hereinafter). As illustrated in FIGURE 1, the cable 40 includes a lower end portion 46 which is helically wound about the lead screw 32 to form a multi-turn helix, the purpose of which is described hereinafter.

As shown in FIGURE 1, the cable 40 extends upwardly from the helical section 46 through an aperture 48 in the nut 34, along a vertically extending recess 50 in the outer surface of the push rod 38, and through an aperture (not shown) near the upper end of the push rod 38 into the hollow inner portion thereof. From this point the cable extends through an aperture 52 provided in the solid upper extremity of the push rod 38 and through the central support 16 of the control rod 10.

In the illustrated embodiment of the invention, the cable 40 is not a one piece cable, but is rather in two sections, 40a and 40b, the sections being joined by an electrical connector 54 at the juncture of the control rod 10 with the upper extremity in the push rod 38. Accordingly, the control rod 10 may be readily separated from the push rod 38.

The upper end of the cable 40 is terminated at and is suitably anchored to the uppermost extremity of the control rod 10. The manner in which the end of the cable 40 is anchored is not critical as long as it is securely and fixedly held in position. The pair of conductors in the cable 40 are electrically connected together at the upper end so as to form a continuous path for current flow from the electrical feed through connector 42 through one conductor to the upper end of the control rod 10 and then back through the other conductor to the connector 42.

As illustrated in FIGURE 1, the cable 40 is fixedly secured to the nut 34, and also is fixedly clamped to the push rod and the control rod 10 at a plurality of locations along the length thereof by suitable means, such as cable clamps 56. Movement of the control rod 10 and hence the section of the conductor above that fixed to the nut 34 relative to that at the feed through connector 42 is afforded by the turns of the helix 46 moving relative to each other. The cable 40 is preferably made of resilient material so that the helix returns to its original shape when the control rod is withdrawn from the core.

One specific construction that may be utilized for the cable 40 in the control rod monitoring system contemplated by the present invention, is illustrated in FIGURE 3, wherein a portion of the helix is shown. A cable of this type includes a pair of spaced apart wires 58 and 60 of high temperature, radiation resistant conductive material, such as aluminum.

The conductors 58 and 60 are surrounded by and embedded within an insulating medium 62 of a material which can withstand the radiation and high temperatures encountered in the reactor. A ceramic such as magnesium oxide is a suitable material. The insulating medium 62, in turn, is encased in tube 64 of a resilient material suitable for use in an inert gas at high temperature, such as stainless steel.

An alternate cable structure is illustrated in FIGURE 4, wherein a portion of the helix is shown. This latter configuration includes a pair of conductors, 66 and 68, each of which is suitably insulated with ceramic material 70 and encased in a stainless steel tube 72. The tubes 72 are suitably joined together, as by brazing, at selected intervals to form the cable 40.

In the construction of a control rod and push rod incorporating the preferred embodiment of the monitoring system hereinbefore described, the length of the cable 40 extending from the end of the control rod 10 to the aperture 48 in the nut 34 is such as to allow normal thermal expansion of the control rod 10 and push rod 38, without resulting in a severance thereof. However, the length of the cable 46 is such that if a separation occurs in the control rod 10 itself or in the push rod 38, or if the control rod 10 becomes disassociated from the push rod 38, movement of the nut 34 relative to the broken segment results in a severance of the cable 40.

The manner in which the monitoring system functions to yield an indication of a break in the continuity of a control rod 10 can best be appreciated from the following operational description. In normal operation of a nuclear reactor one or more control rods are positioned relative to the reactor core so that a selected power level can be reached and maintained. Upon actuation of the control rod drive 30, rotary motion is imparted to the lead screw 32 and vertical motion is imparted to the push rod 38 due to the translation of the rotary movement of the lead screw 32 into axial movement of the nut 34. The control rod 10 is thereby lowered, the upper end of the cable 40 remaining in the same position relative to the section thereof that is secured within the aperture 48 of the nut 34.

The helically wound lower portion 46 of the cable 40 contracts as the control rod 10 is moved toward the control rod drive mechanism 23. If a break in the control rod 10 or in the push rod 38 occurs, a severance of the cable 40 results when the portion of the control rod and/or push rod below the break is moved relative to that above the break. A severance of the cable produces an open circuit signal which will be transmitted to the control circuit 44 to indicate a malfunction.

In one embodiment of a control circuit that can be utilized in conjunction with monitoring system, an electrical power source (not shown) and the coil of a relay (not shown) are connected in series with the cable 40. The contacts of the relay are arranged so that "scramming" of the reactor or other corrective action is initiated when the relay becomes deenergized. In addition, a ground detection relay (not shown) may be provided in the control circuit to indicate any defect in the insulation of the cable 40 whereby current is shorted to the metallic parts of the assembly. Such shorting of the current prevents detection of a separation of the control rod above such defect.

From the foregoing, it can be seen that a monitoring system has been provided which can be utilized to continually maintain a check on the structural continuity of control rods, or other elements that are selectively positioned within the core of a nuclear reactor. Various changes and modifications may be made in the above described system without departing from the spirit and scope of the invention.

Various features of the monitoring system are set forth in the following claims.

What is claimed is:

1. In a nuclear reactor including a reactor core, the combination of a control rod, a control rod drive for selectively positioning the control rod within the reactor core, and a control rod integrity monitoring system, said system comprising an insulated current carrying conductor, a first portion of said conductor extending along the length of the control rod, means securing said first conductor portion to said control rod at least at two locations, means securing a second portion of the conductor to the control rod drive in a fixed relation to the first conductor portion, the portion of said conductor between said first portion and said second portion being wound in a helix to thereby allow free and unrestricted movement of the first conductor portion relative to said second conductor portion.

2. In a nuclear reactor including a reactor core, the combination of at least one control rod, a control rod drive for selectively positioning the control rod within the reactor core, and a control rod integrity monitoring system, said system comprising an insulated current carrying pair of conductors electrically shorted at one end, means responsive to an open circuit condition for yielding an indication, a first portion of said pair of conductors adjacent said one end extending along the length of the control rod, means securing said first conductor portion to said control rod, an electrical connector fixedly located within said control rod drive, the other end of said pair of conductors being connected to said electrical connector, and means for connecting the indication yielding means to said connector, a portion of said pair of conductors between said first conductor portion and said second conductor portion being helically wound to allow free and unrestricted movement of the pair of conductors secured to said control rod relative to that secured to said control rod drive.

References Cited in the file of this patent

UNITED STATES PATENTS

| | | |
|---|---|---|
| 2,600,029 | Stone | June 10, 1952 |
| 3,024,647 | Merriman | Mar. 13, 1962 |

OTHER REFERENCES

Schultz: "Control of Nuclear Reactors and Power Plants," 1st edit., 1955, McGraw-Hill, p. 100.